Nov. 10, 1925.

M. P. WEINBACH

VECTOR CALCULATOR

Filed Dec. 23, 1924

Witnesses:

Inventor
Mendel P. Weinbach

By Richard P. Owen
Attorney

Nov. 10, 1925.

M. P. WEINBACH

VECTOR CALCULATOR

Filed Dec. 23, 1924    2 Sheets-Sheet 2

1,560,747

Witnesses:

Inventor
Mendel P. Weinbach

By Richard B. Owen.
Attorney

Patented Nov. 10, 1925.

1,560,747

UNITED STATES PATENT OFFICE.

MENDEL P. WEINBACH, OF COLUMBIA, MISSOURI.

VECTOR CALCULATOR.

Application filed December 23, 1924. Serial No. 757,750.

*To all whom it may concern:*

Be it known that I, MENDEL P. WEINBACH, a citizen of the United States, residing at Columbia, in the county of Boone and State of Missouri, have invented certain new and useful Improvements in Vector Calculators, of which the following is a specification.

In engineering calculations, there frequently occur additions and subtractions of quantities that have not only magnitude but also direction. For instance, a force may have a definite magnitude acting in a definite direction with respect to another direction assumed fixed. The numerical value of the magnitude of such a quantity is called tensor or modulus and the angle the quantity makes with the fixed axis of reference is called position angle, phase or argument.

In addition or subtraction of two or more such quantities, consideration must be given not only to their numerical magnitude, but also to their direction. The sum or difference of such vector quantities is said to be a geometrical sum or difference, respectively.

The addition or subtraction of two such vector quantities may be performed mathematically. It involves the looking up of five trigonometric functions in trigonometric tables, six multiplications, three additions, one division and the taking of one square root.

The addition or subtraction of two such vector quantities may also be performed by a graphical construction, which involves the laying off of lines of length proportional to the magnitude of the vectors to be added or subtracted, and at angles equal to the vector angles. The addition or subtraction being done geometrically by the use of drawing instruments.

The primary object of this invention is to provide a novel device which performs additions or subtractions of vector quantities mechanically with a degree of accuracy commensurate with the physical size of the device.

Another object of the invention is to provide a device which will eliminate the long and tedious mathematical calculations, which, as mentioned above involves a minimum of ten calculations, or in the elimination of the graphical construction which involves the use of drawing instruments and care in construction.

With these and other objects in view, the invention consists in the novel construction, arrangement and formation of parts as will be hereinafter more specifically described, claimed and illustrated in the accompanying drawings, in which drawings:—

Figure 1:
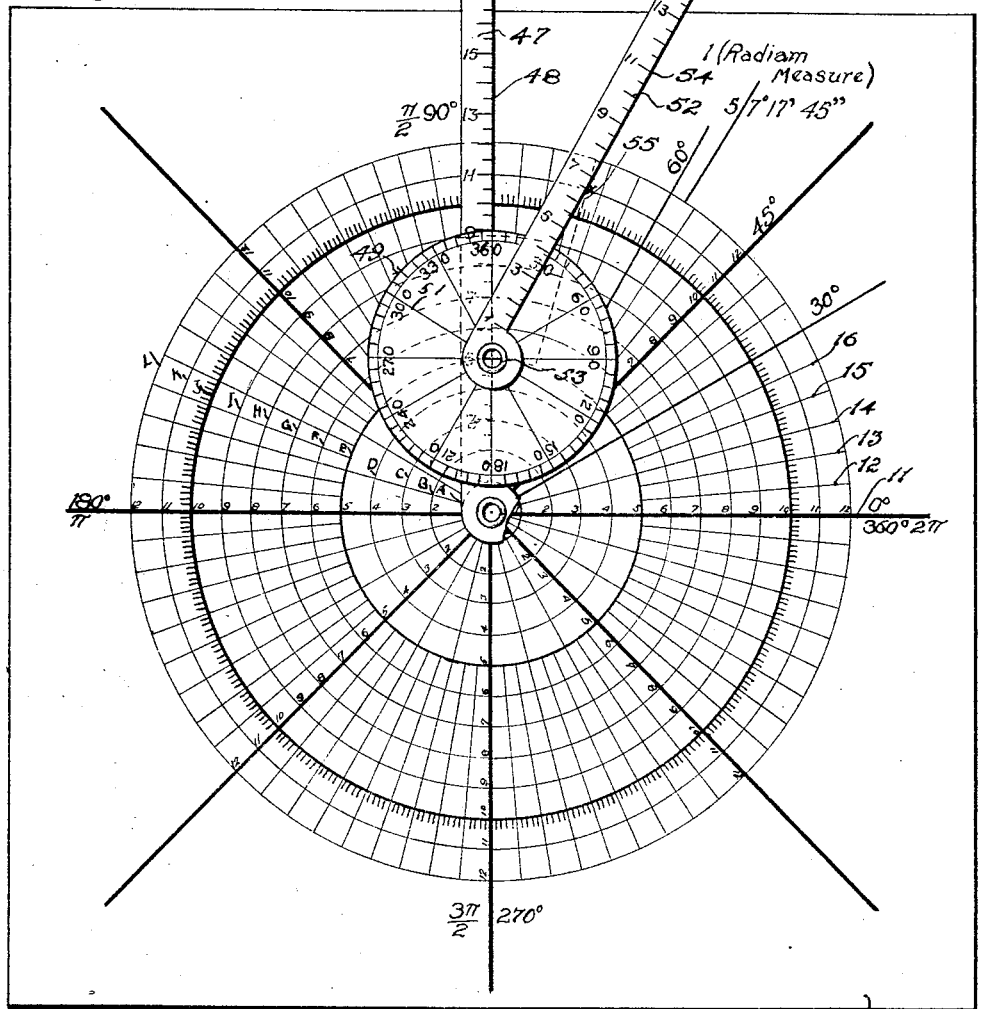
Figure 1 is a plan view of the improved device.
Figure 2:
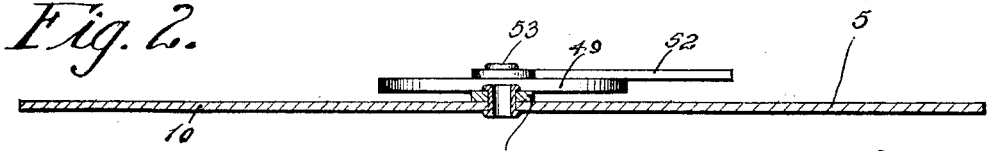
Figure 2 is a central diametric section through the improve device.
Figure 3:
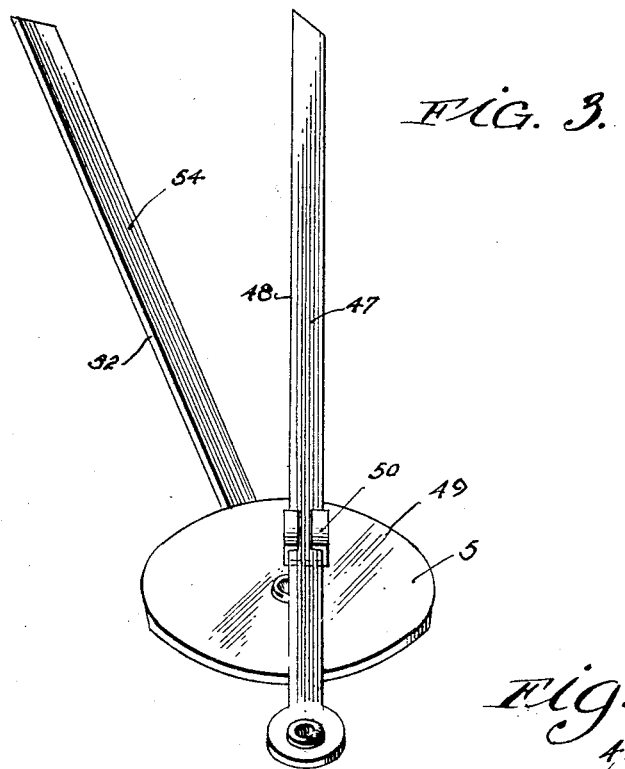
Figure 3 is a detail perspective view of a portion of the device showing the bottom face thereof.
Figure 5:
Figure 5 is a detail sectional view illustrating the guide mounted upon the main arm.
Figure 4:
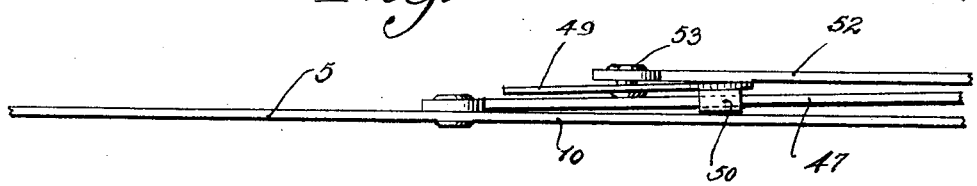
Figure 4 is an enlarged fragmentary edge elevation of the improved calculator.

Referring to the drawings in detail, wherein similar reference characters designate corresponding parts throughout the several views, the numeral 5 indicates the improved calculator which comprises a flat plate 10 made of substantial but light material, such as bakelite, celluloid or the like. The thickness of the plate depends primarily upon the desired durability.

Concentric circles, A, B, C, D, E, F, G, H, I, J, K and L are either engraved or printed on the plate 10. The radii of these circles increase in arithmetical progression, that is, the first circle is of radius one unit or one tenth of such a unit: the second circle is of the radius two units or two tenths of such a unit: the third circle is of a radius of three units or three tenths of such a unit and so on.

One of these concentric circles indicated by the reference character J is graduated in degrees. The radii are indicated by the reference characters 11, 12, 13, 14, 15, 16 and etc. and are printed or engraved at equal angular spacing distances as shown in the drawing, and are scaled from center in units and decimal fractions of such units.

A measuring arm 47 is pivoted at the center of the plate and may be turned about this center in such a manner that its straight edge indicated by the reference character 48 can be set at any angular position as read or measured on the graduated circle J of the plate 10. This measuring arm 47 is preferably made of transparent material such as celluloid or the like and has its straight edge 48 graduated in the same units as the radii. By turning the measuring arm the straight edge can be made to coincide with any radius and is in fact a movable radius of the various circles.

This straight edge 48 represents a vector, whose numerical value can be read on and in terms of the units along the straight edge. By rotating the arm 47 from the radius 11, the straight edge of member 47 can be set at the required position of the vector as read on the graduated scale of the circle J.

A disk 49 of transparent material is provided for sliding movement along the measuring arm 47 and as shown the disk 49 carries a guide 50 on its lower face for engaging said measuring arm. This disk 49 is provided with a plurality of radii 51 which are of a definite number of units of the same magnitude as the straight edge of the arm 47 and radii of the plate 10. By the use of the guide 50 or some other similar device, the disk 49 is made to slide easily but firmly along the length of the measuring arm 47 in such a manner that the center of the circular member of disk 49 moves along the straight and graduated edge of the arm 47. The periphery of the disk 49 is graduated in degrees commencing from the straight edge of the measuring arm 48.

A measuring arm 52 of identically the same construction as the measuring arm 47 is pivoted at the center of the disk 49 as at 53, and can be turned about this center no matter in what position the disk 49 is along the arm 47. The straight and graduated edge 54 of the measuring arm 52 proceeds from the center of the disk 49, in the same manner as the graduated straight edge 48 of the measuring arm 47, proceeds from the center of the concentric circles A, B, C, etc.

The arm 52 represents the other vector, whose magnitude is read on and in terms of the unit as marked on the straight edge 54. The angular position of this vector is set by the circular graduated scale of the disk 49.

To obtain the sum of two vectors, for instance one of five units and position angle 90° and one of seven units and position angle of 60° the calculating device is operated as follows:—

The measuring arm 47 is set at an angle of 90° from the horizontal radii 11 of the plate 10 as read on the graduated circle J.

The disk 49 is now slid on the measuring arm 47 until the center of the disk coincides with the numerical magnitude of the vector considered, which for the example given, the center of the disk must be on the division 5 of the graduated straight edge 48. Since at the center of the disk 49 there is a pivot, the setting of center of the disk 49 on the required division on the graduated straight edge 48 of the arm 47 cannot be made directly. If the radius of the disk 49, is, however, a definite number of units, the center of this disk will be on the required division of the arm 47 when the rim of the disk 49 is on a division of the arm 47 equal to the length of the vector plus the radius of the disk. Thus if the radius of the disk is four units, then for the example given, the center of the disk will be on division five of the arm 47 when the rim of the disk is on the division nine of the arm.

The arm 52 is now rotated about the graduated scale of the disk from the zero division of that scale which is on the straight edge of the arm 47, to an angular position equal to the difference between the angles of the two vectors as read on graduated scale of the disk 49. That is the straight edge of the arm 52, for the example given, is set on the graduated scale of the disk at an angle equal to 90°, minus 60° equalling 30°.

If the difference between the vector angles is positive as in the given example, the arm 52 is rotated in a direction clockwise from the zero position of graduated scale of the disk. On the other hand if this difference happens to be negative say 60° minus 90° equals minus 30°, which would have occurred if the vector of seven units of length would have been used first, then the arm 52 must be rotated in a counter clockwise direction from the zero position of graduated circular rim of the disk 49.

The numerical value of the second vector is read on the straight graduated edge of the arm 52 and the point of intersection of this scale division of the arm 52 with a radius of plate 10 gives the numerical value of the sum as read on the corresponding radius of the said member 10. In the example given it would be the intersection of division 7 of the graduated straight edge of the arm 52 with the radius marked 55 in dotted lines at the point X on the drawing. The length of this radius 55 from the center of member 10 to the point of intersection with straight edge 54 of arm 52 is the sum of the two given vectors. It is for the given example 11.6 units.

The angular position of this vector sum is given by the angle the radius 55 makes with the horizontal radius 11 as read on the graduated circle J of the plate 10. For the example given it is 72.5 degrees.

If instead of an addition of the vectors, they are to be subtracted, the operation is entirely identical with that described above with the exception that the graduated straight edge of the arm 52 is set at an angular position read on the circular scale of the disk 49 equal to the difference between the angles of the two vectors plus 180°.

Thus in the example given, if the vector of seven units and angle of 60° is to be subtracted from the vector of five units and angle 90° the straight graduated edge of member 52 is set at an angle of 90° minus 60° plus 180° equals 210° as read on the graduated rim of the disk 49.

Changes as to details may be made without departing from the spirit or the scope of this invention, but:—

What I claim as new is:

1. A vector calculator comprising a plate having a plurality of concentrically arranged circles spaced equal distances apart, a graduated arm pivoted to the plate at the axis of said circles, a graduated disk slidably mounted upon the measuring arm, and a second graduated arm pivotally mounted to the disk at the axis thereof.

2. In a vector calculator, a plate, a plurality of concentrically disposed circles on the plate spaced equal distances apart, each space equalling a unit of calculation, an arm pivotally secured to the plate at the axis of the circle having a straight edge graduated to correspond to the units, a disk slidably mounted on the arm having its periphery graduated, and a second measuring arm pivoted to the disk at the axis thereof graduated to correspond with the first mentioned arm.

3. In a vector calculator, a plate, a plurality of equi-distantly spaced concentrically arranged circles, one of said circles being graduated into degrees, the distance between each circle representing a unit of calculation, an arm pivoted to the plate at the axis of the circle having a straight graduated edge, corresponding to said units of calculation, a disk slidably mounted on the arm having its radius of a definite number of units of the same magnitude as the radius of the circle, the disk being so disposed as to permit the axis thereof to coincide with the straight edge of the measuring arm, a second measuring arm pivoted at the axis of the disk and graduated in the same manner as the first mentioned arm and arranged for movement over the disk and the plate.

4. A vector calculator including a plate provided with a circular series of radial graduations representing the degrees of a circle, an arm having one end pivoted to the plate at the axis of said circle and having a straight edge radial to said axis, said arm being provided with outwardly progressing transverse divisions representing the numerical magnitudes of vectors, a disc slidable longitudinally of and mounted on said arm and having a circular series of radial graduations representing the degrees of a circle concentric with the axis of said disc, said disc being disposed with its axis and its zero graduation coincident with the straight edge of said arm, and a second arm having one end pivoted to the disc at the axis thereof and having a straight edge radial to said axis, said second arm being provided with outwardly progressing transverse divisions representing the numerical magnitudes of vectors.

In testimony whereof I affix my signature.

MENDEL P. WEINBACH.